Oct. 26, 1971  GERHARDUS MINKE  3,615,112
BALER KNOT TYING MEANS

Filed April 25, 1969  5 Sheets-Sheet 1

INVENTOR
Gerhardus Minke
By Cushman, Darby & Cushman
ATTORNEYS

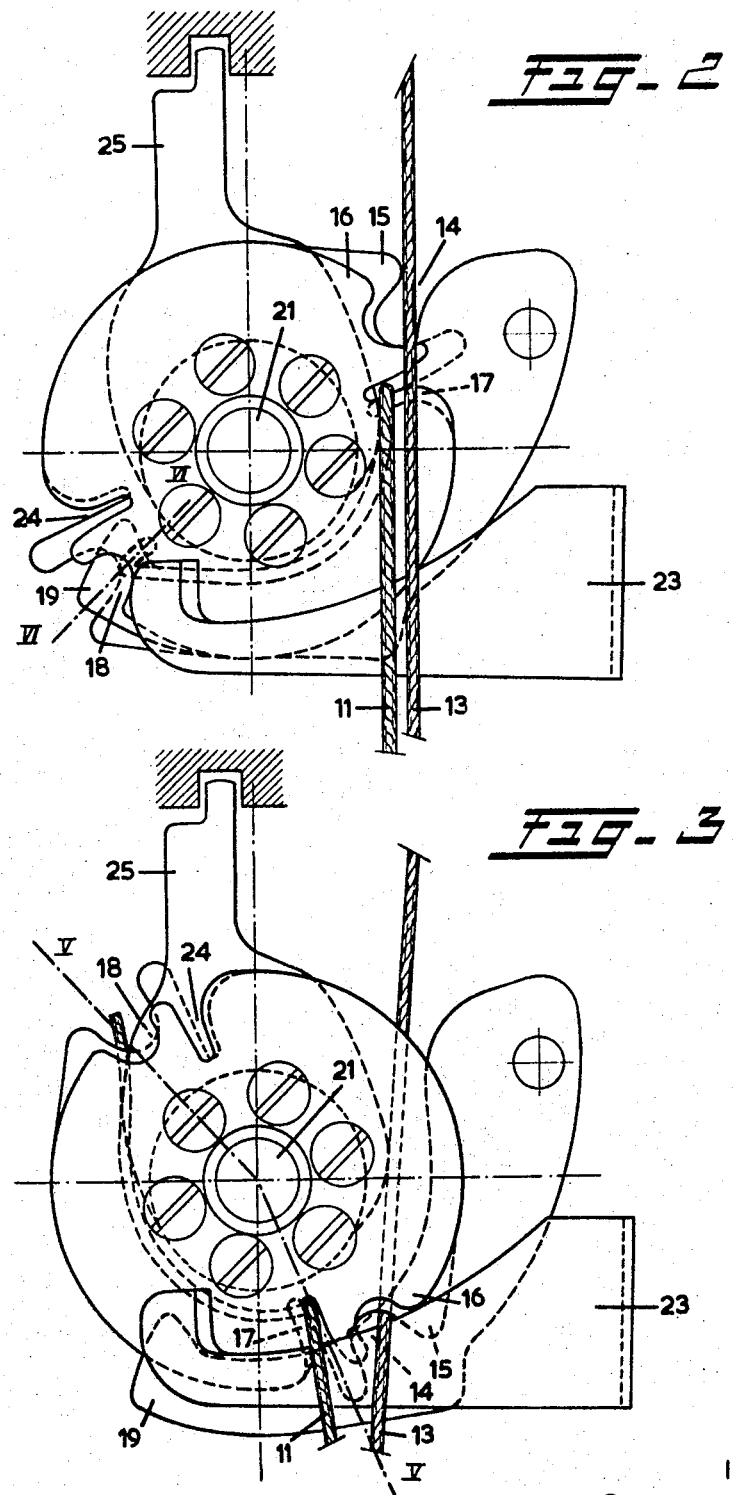

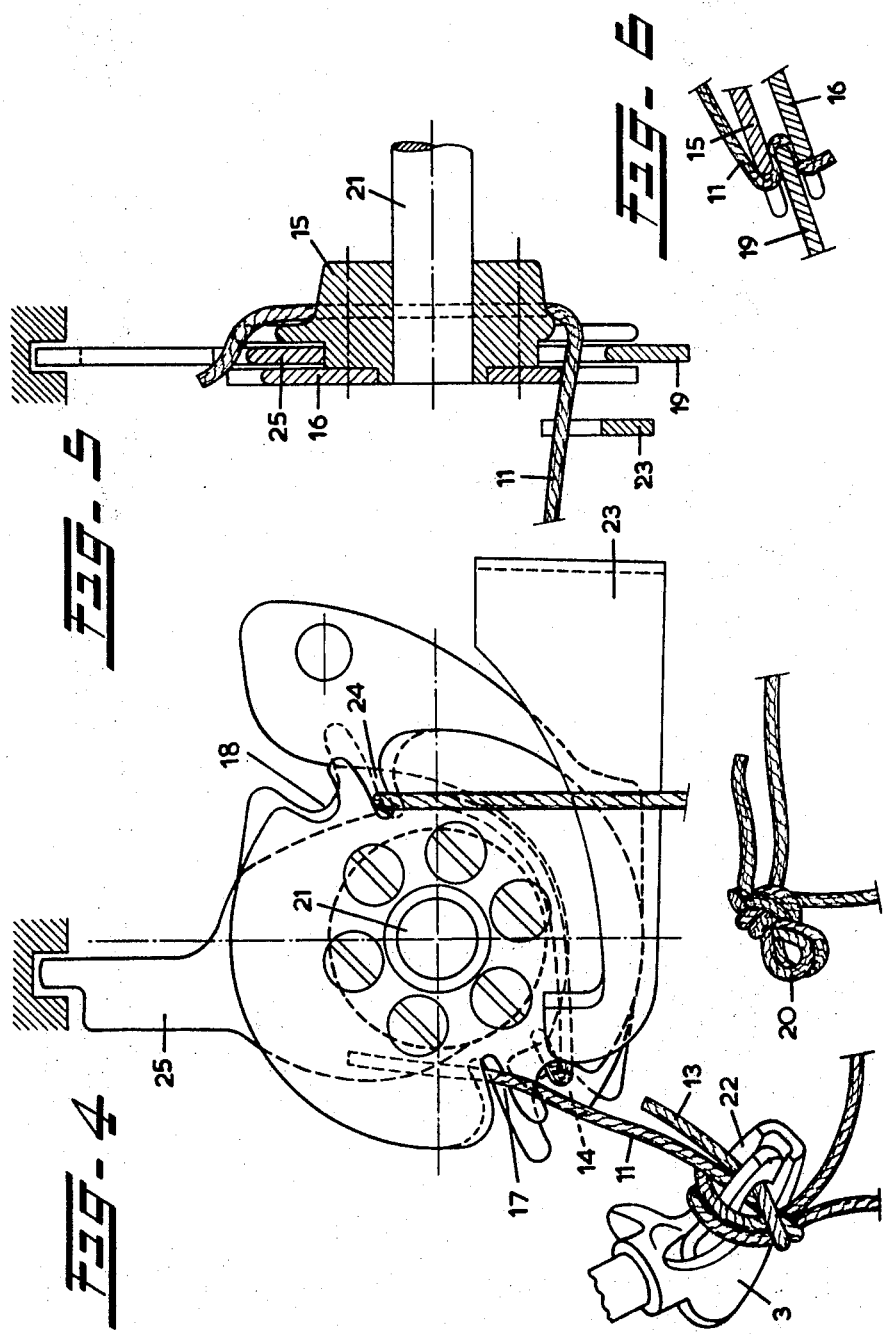

Oct. 26, 1971 GERHARDUS MINKE 3,615,112
BALER KNOT TYING MEANS
Filed April 25, 1969 5 Sheets-Sheet 4

INVENTOR
Gerhardus Minke
by Cushman, Darby & Cushman
ATTORNEY

Oct. 26, 1971  GERHARDUS MINKE  3,615,112
BALER KNOT TYING MEANS
Filed April 25, 1969  5 Sheets-Sheet 5
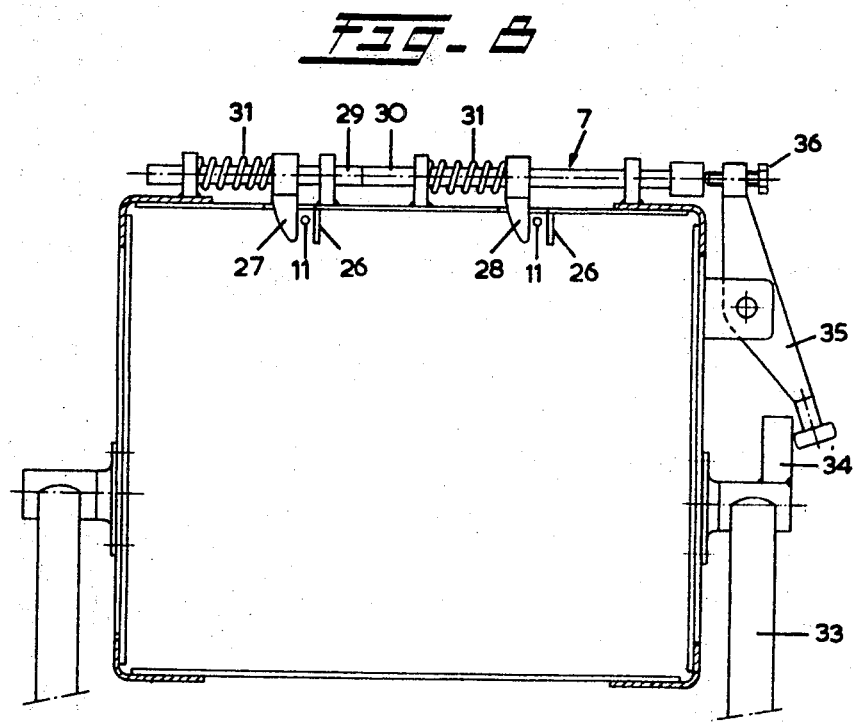
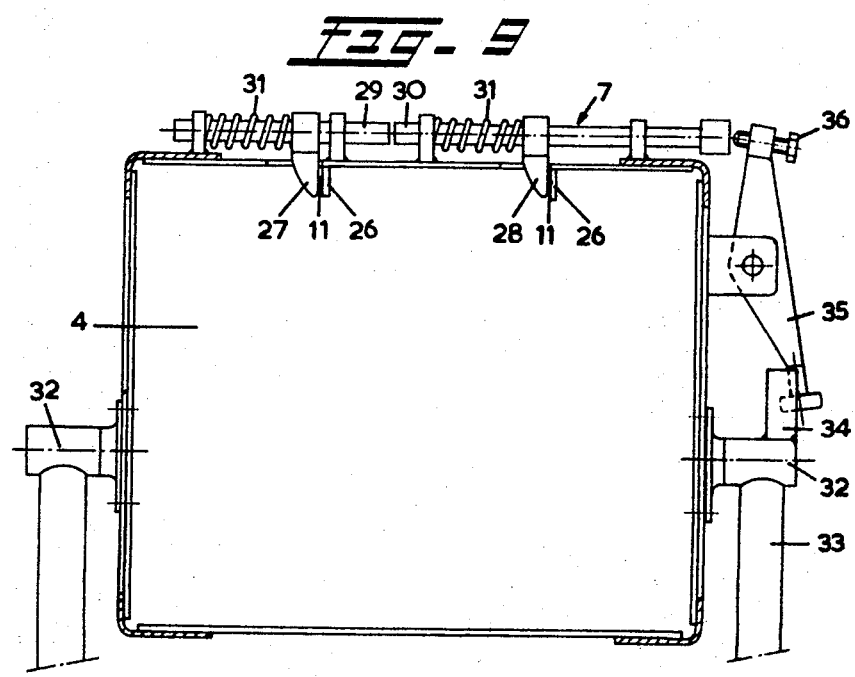
INVENTOR
Gerhardus Minke
By Cushman, Darby & Cushman
ATTORNEYS United States Patent Office 3,615,112
Patented Oct. 26, 1971

3,615,112
BALER KNOT TYING MEANS
Gerhardus Minke, Appingedam, Netherlands, assignor to Ter Borg & Mensinga's Machinefabriek N.V., Appingedam, Netherlands
Filed Apr. 25, 1969, Ser. No. 819,220
Claims priority, application Netherlands, Apr. 25, 1968, 6805885
Int. Cl. B65h 69/04
U.S. Cl. 289—13
3 Claims

ABSTRACT OF THE DISCLOSURE

A baler of the kind comprising a baling chamber and a tying device including a movable needle and a knotter, characterized by a clamping device capable of clamping a twine, passed from the baling chamber to the knotter, in front of the entrance to the knotter.

---

This invention relates to a baler of the kind comprising a baling chamber and a tying device including a movable needle and a knotter.

In such a baler, difficulties are encountered in making a proper knot in a twine tied around a bale, independently of the degree of compacting or the kind of material to be pressed or the thickness of the twine, owing to the fact that the ends of the twine are not sufficiently retained under all circumstances, or by reason of the fact that the twine encounters too little resistance between the material to be compressed and the wall of the baling chamber.

It is an object of the present invention to obviate these disadvantages.

To this effect, according to the invention, there is provided a baler of the kind comprising a baling chamber and a tying device including a movable needle and a knotter, characterized by a clamping device capable of clamping a twine, passed from the baling chamber to the knotter, in front of the entrance to the knotter.

The twine is thus clamped independently of the degree of compacting of the material, which ensures a proper knot under all operating conditions.

In an effective embodiment of the invention, the clamping device comprises a dog biased against a guide member in the baling chamber, which results in a simple design of the clamping device, applicable independently of the type of knotter.

Preferably, the clamping device is arranged to be kept in its clamping position through the action of spring means, and urged into a non-clamping position through the needle moving mechanism, for which purpose said mechanism may be provided with a lever carrying a cam.

According to a further elaboration of the invention, the baler is characterized by some clearance between the clamping device and the needle moving mechanism in the clamping position.

This ensures not only that the entire spring force is operative in the clamping position, but that differences in thickness of the twine, particularly when more than one piece of twine is used for a bale, have no adverse effect on the making of the knot.

One embodiment of the invention will now be described, by way of example, with reference to the accompanying drawings, in which FIG. 1 is a diagrammatic view of a knotter for pressed bales, which shows the course of a twine;

FIGS. 2, 3 and 4 show, in full size, a cord holder of the knotter shown in FIG. 1 in three differente positions, each position being turned through 90° relative to the preceding one;

FIG. 5 shows a cross-sectional view on the line V—V in FIG. 3;

FIG. 6 shows a cross-sectional view on the line VI—VI in FIG. 2, to show the operation of a twine clamp of the cord holder;

FIGS. 8 and 9 shows a cross-sectional view of the baling chamber with clamping device as shown in FIG. 7, in the non-clamping and clamping position, respectively.

Figure 7:
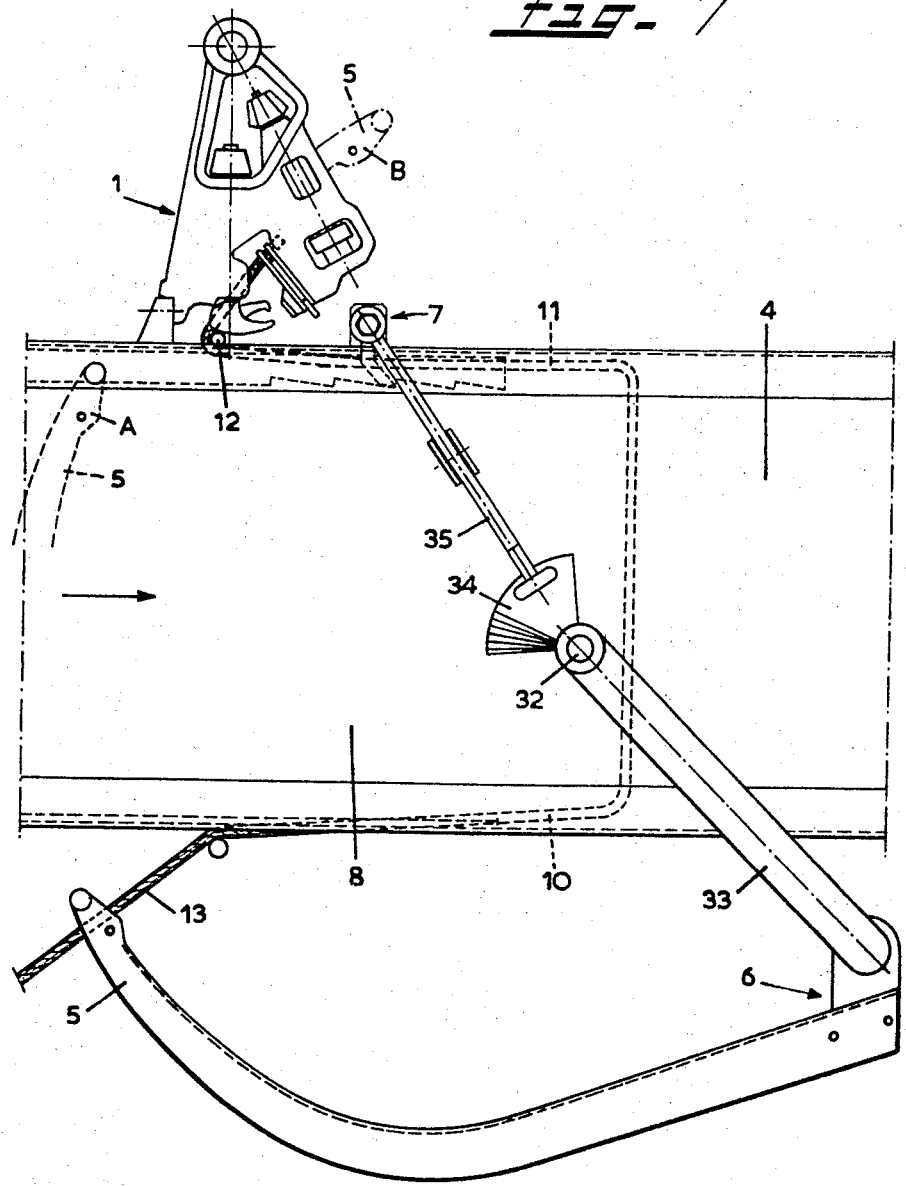
FIG. 7 is a side view on a reduced scale of the baling chamber with knotter, needle moving mechanism, and clamping mechanism according to the invention, with the needle shown in three different positions.

FIGS. 1–6 illustrate the operation of the knotter 1 with cord holder 2 and knotting mechanism 3. FIGS. 7–9 illustrate the co-operation between knotter 1, baler 4, needle 5 with needle drive 6, and clamping device 7.

Figure 1:
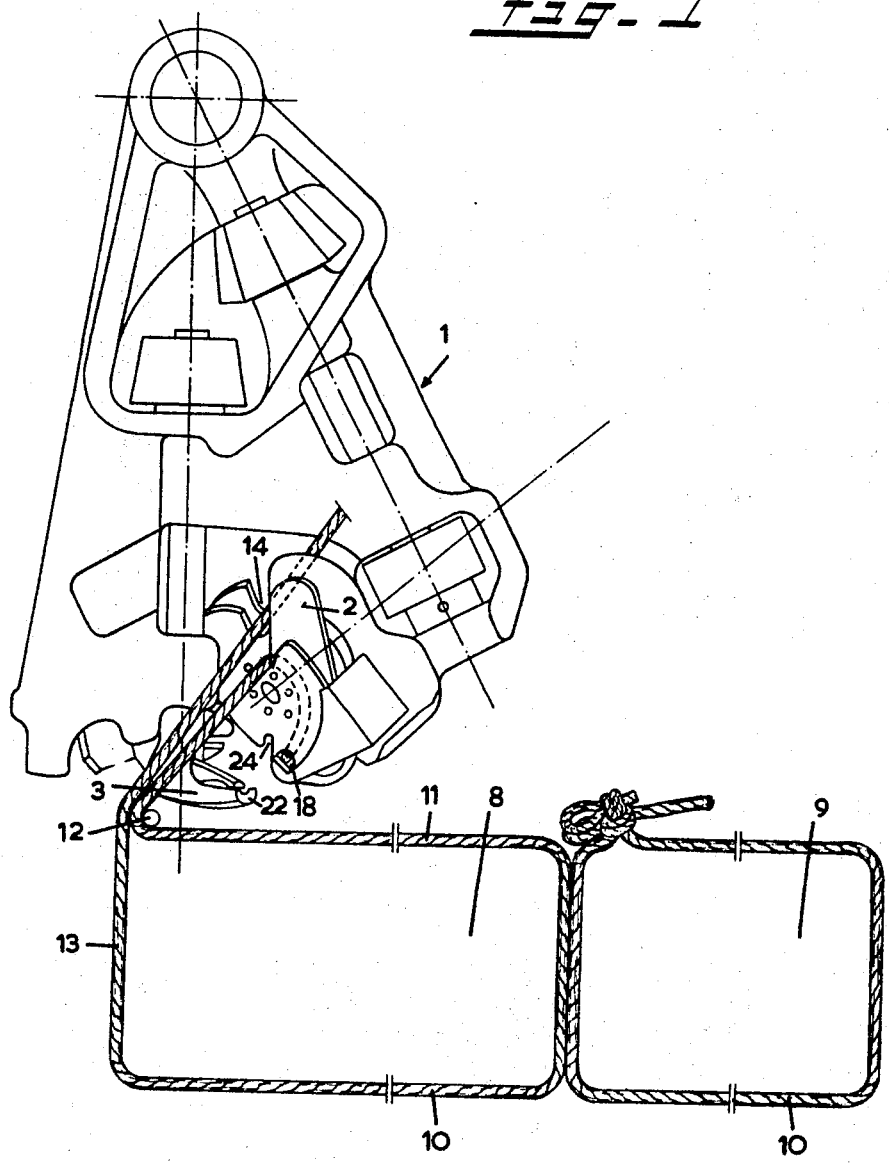

Referring to FIG. 1, a bale 8 of the material to be press-packed, such as straw or hay, is at the knotter 1. This bale is being compressed in known manner in the baling chamber, the counter-pressure being provided by a bale 9 already compressed and tied. The end portion 11 of twine 10 (also see FIG. 7) is retained by the cord holder 2 of the knotter 1. The twine passes through a twine finger 12 around the bale 8, and is supplied from a supply holder not shown as the bale is pressed. After the bale has reached the desired length, the needle 5 moves behind the bale, bringing the twine end 13, connected with the twine supply, into a wide recess 14 of two disks 15 and 16 of the cord holder 2. The twine end 11 passes through a narrow recess 17 in the two disks of the cord holder 2 and along the back of the cord holder to the wide recess 18, where the end is retained by a cord holder clamp 19. For tying a knot 20 in the two ends 11 and 13 of the twine by means of the knotting mechanism 3, the two disks 15 and 16 of the cord holder 2 are turned through 180° about a shaft 21. After a rotation of about 15°, the cord holder clamp 19 releases the twine end 11, so that it is only retained in the cord holder through friction in the narrow recess 17. In the position shown in FIG. 3, the two disks 15 and 16 of the cord holder have turned through 90°. The knotting mechanism 3 has meanwhile become operative. In FIG. 4, the position of the knotting mechanism is shown at the moment when the two disks 15 and 16 have made a total rotation of 180°, in which the cord holder is again at rest. After the formation of the knot 20 by means of knotter hook 22 of the knotter mechanism 3, the end 13 is severed by means of a knife 23, now being retained by means of cord holder clamp 19. This severed portion is the end of the twine for the next bale to be formed, being retained in a narrow recess 24 diametrically opposite to the narrow recess 17. Meanwhile the end 11 has been forced out of the narrow recess 17 by means of an ejector plate 25, so that after the formation of the knot 20 the bale can be forced out of the baling chamber.

Referring to FIGS. 7, 8 and 9, there will now follow a description of the clamping device 7. Arranged in the baling chamber 4 longitudinally of the direction of advance of the bales, is a pair of guide members 26. The location of the guide members has been selected such that the twines run just alongside them. Two clamping dogs 27 and 28 are mounted in known manner on guide rods 29, 30 co-axially mounted transversely of the direction of advance of the bales, and extend through openings in the top into the baling chamber 4. To prevent fouling, the dogs are bevelled in the direction of pressing and downwardly. Under the influence of a pair of springs 31, the dogs with the guide rods are urged to the right in FIGS. 8 and 9 into contact with the guide members 26. The needle moving mechanism 6 is journalled on opposite sides of the baling chamber for movement about a shaft 32. The further drive of the needle moving mechanism has not been illustrated, this being well-known to those skilled in the art. The needle moving mechanism comprises a pair of arms 33 extending around the bottom of the baling chamber and carrying the arm 6 for the needle 5. One of the arms has an operating cam 34. Furthermore, a lever construction 35 is mounted on the outside of the baling chamber.

In the position of the needle 5 shown in continuous lines in FIG. 7, which position corresponds with the cross-section in FIG. 8, the baling chamber is free of obstacles, and a bale can be pressed in it in the direction of the arrow. This position of the needle corresponds with the position of the cord holder 2 of the knotter 1 as illustrated in FIGS. 2 and 4. The end portion 11 of the twine is therefore firmly held by the cord holder clamp 19. A raised portion of the cam 34 is then located opposite one end of the lever construction 35. The other end of the lever will then press against the end of the guide rod 30, and the latter, in turn, against the guide rod 29. The dogs 27 and 28 are thus clear of the guide members 26, and as the bale is pressed, the twine ends 11 can move freely between the dogs and the guide members 26. After the bale has been pressed to the desired length the needle will be moved upwardly to the dotted position as indicated by A, the end of the lever construction 35 moving over the operating cam 34. As the needle is moving further towards the position designated B in FIG. 7, the end of the lever construction 35 will move down a bevel of the cam 34 and occupy the position shown in FIG. 9. Under the influence of the springs 31 the dogs 27 and 28 with their guide rods 29 and 30, respectively, will be forced towards the guide members 26, clamping the end portions 11 of the twines. The guide rods and the lever mechanism 35 are so dimensioned that, independently of twine tolerances, there is an amount of clearance both between the two guide rods 29 and 30 and between the guide rod 30 and the upper end of the lever construction 35. In the embodiment shown, the lever construction 35 is provided for the purpose, inter alia, with an adjustable screw 36. In the position designated B in FIG. 7, the clamping device 7 is fully operative, and the knotter 1 becomes operative.

The two disks 15 and 16 of the cord holder 2 will be turned and after a relatively short rotation of 15° the cord holder clamp 19 will no longer clamp the end portion 11 of the twine. The tension in the twine is, however, fully taken up by the clamping device 7, so that there is no danger that the twine slips from the narrow recess 17.

Not only is the clamping device according to the invention insensitive to thickness tolerance of the twine, but it is even possible to use twines of different thicknesses without adaptation of the knotter. Furthermore, the clamping device is not only applicable to the knotting mechanism as described, but can also be used with any other kind of knotting mechanism.

I claim:

1. A baler comprising: means defining a baling chamber; a tying device including a movable needle, a moving mechanism therefor and a knotter; and a clamping device for clamping a twine passing from the baling chamber to the knotter, said clamping device including a dog biased against a guide member in the baling chamber, spring means for keeping the dog in a clamping position and means associated with the needle moving mechanism for urging the dog toward a nonclamping position when said moving mechanism reaches a predetermined position.

2. A baler according to claim 1 in which the means associated with the needle moving mechanism comprises a cam on a lever of said mechanism.

3. A baler according to claim 1 in which the means associated with the needle moving mechanism has such dimensions as to provide some clearance between this means and the clamping device in the clamping position of the latter.

References Cited

UNITED STATES PATENTS

| 2,246,217 | 6/1941 | Noling | 289—2 X |
| 2,807,487 | 9/1957 | Tarbox et al. | 289—13 X |

LOUIS K. RIMRODT, Primary Examiner